United States Patent Office 3,360,473
Patented Dec. 26, 1967

3,360,473
HYDROXYLIC ACTIVATION OF CHEMILUMINES-
CENCE OF THE CHEMILUMINESCENT TETRA-
KIS-(PER-TERTIARYAMINOETHYLENES)
Hilmer Ernest Winberg, Wilmington, Del., assignor to E. I.
du Pont de Nemours and Company, Wilmington, Del.,
a corporation of Delaware
No Drawing. Filed Mar. 12, 1965, Ser. No. 439,481
8 Claims. (Cl. 252—188.3)

ABSTRACT OF THE DISCLOSURE

This application discloses chemiluminescent formulations comprising (a) at least one tetrakis(disubstituted-amino)ethylene of the formula

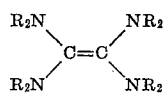

in which the R's individually, are $C_1$–$C_{10}$ alkyl or cycloalkyl, or, in pairs, are divalent alkylene of 1–4 carbon atoms, (b) a nonquenching organic solvent, and (c) 0.01–10% (by volume of total formulation) of a hydroxylic activator, e.g., water or an alcohol. Also shown are gel and aerosol charges of such formulations and a method for improving the luminescence of the aminoethylenes by adding (c) to a mixture of (a) and (b).

Field of the invention

This invention relates to chemiluminescent compositions containing hydroxylic activators and to a method of increasing the chemiluminescence or oxyluminescence of certain tetrakis(disubstituted amino)ethylenes including tetrakis(dimethylamino)ethylene, the latter compound being referred to hereinafter for convenience as TMAE. More particularly, this invention relates to a method for activating the chemiluminescence of TMAE and other per-secondary aminoethylenes when homogeneously dissolved in inert solvents therefor, particularly inert hydrocarbon solvents.

Background and details of the invention

My U.S. Pat. No. 3,264,221 shows the improvement in the overall intensity of and longevity of chemiluminescence of TMAE, achieved in those instances wherein the compound is suspended in immiscible solvent systems, by virtue of the addition thereto of certain hydroxylic-containing additives which are characterized by the specific property that they are solvents for the degradation products from the chemiluminescent reaction, e.g., solvents for the reaction products tetramethyloxamide and tetramethyl-urea and possibly other degradation products not yet specifically identified.

It had been thought that the reason for the necessity of such additives to the tetrakis(dihydrocarbylamino)ethylene compositions was a primary function of the fact that in the systems involved the peraminoethylene, e.g. TMAE, was grossly immiscible. I have now found to my surprise that the chemiluminescence of the peraminoethylenes, e.g. TMAE, in any system comprising any other material, wherein the peraminoethylene is miscible or not, depends necessarily on the presence of a small but finitely measurable quantity of an hydroxylic material in the peraminoethylene phase. Stated another way, this means that TMAE or related peraminoethylene under any conditions, irrespective of whether or not it is dispersed in the totally immiscible sense or is dissolved in the totally miscible sense, requires, for successful chemiluminescence, the presence homogeneously in the phase which contains the TMAE or related peraminoethylene of a small but finitely measurable quantity of an hydroxylic activator for said chemiluminescence.

TMAE is relatively soluble in a rather wide range of organic solvents, as are the higher tetrakis(dihydrocarbyl-amino)ethylenes. Useful nonquenching solvents which may be incorporated, if desired, into the present chemiluminescent compositions include the hydrocarbons such as n-hexane, decane, decalin, triisobutylene, cetane, tetra-isobutylene, n-octadecane, 1-octadecene, purified kerosenes, white gasolines, or the more viscous hydrocarbons such as mineral oil and the like; nonquenching, preferably essentially hydrocarbon esters such as ethyl acetate and peanut oil; nonquenching hydrocarbon ethers such as tetrahydrofuran, diethyl ether, dimethyl ether, and the like.

Prior to the present invention, it was expected that solutions of TMAE in inert solvents would normally be more efficiently chemiluminescent (either as to intensity, or longevity, or both) because of more uniform mass action than compositions comprising such immiscible compositions as those of my above-mentioned patent. However, it has been unexpectedly found that even in the case of completely homogeneous solutions of TMAE in the just described solvent classes, chemiluminescence or oxyluminescence, respectively, does not occur or, at best, is at an extremely low efficiency if there is not also present in the said compositions a small but finite quantity of a miscible hydroxylic material.

Based on the experience reflected by the detailed examples given below, the said necessary hydroxylic material must be present in amounts of at least 0.01% by volume based on the overall composition. The upper limit is 10% or more for hydroxylic materials whose reaction rate is slow. Preferably, the hydroxylic material should amount to 0.01–5.0%.

The intensity of oxyluminescence of tetrakis(dimethyl-amino)ethylene is dependent on the square of the concentration of the hydroxylic activator. However, in addition to activating the initial oxidation reaction which provides energy necessary to elevate the fluorescent species to an activated state, the hydroxylic materials are quenching agents for the activated state of the fluorescent species. This tends to limit the light output as the hydroxyl concentration becomes too high. The rate of fluorescent quenching varies with structure, being slower with the more hindered hydroxylic material. As a result of these two effects, the optimum concentration of hydroxylic activator present at any time during the oxyluminescent reaction of the peraminoethylenes will depend upon the structure of the hydroxylic activator. Ideally, activator should be supplied at the optimum concentration throughout the oxyluminescent reaction.

This invention makes possible the preparation of chemiluminescent tetrakis(dihydrocarbylamino)ethylene formulations of reproducible and high light output by controlled activation of solvents suitably treated to remove uncontrolled amounts of alcohols, water, peroxides, acids or other activators present as impurities in the crude solvents. Controlled activation can then be obtained by addition of an optimum quantity of a chosen activator to the purified solvent.

The hydroxylic activators useful in the process of this invention include water; alcohols having up to 20 carbon atoms, e.g., methyl, ethyl, n-propyl, isopropyl, n-butyl, t-butyl, isoamyl, decyl, tetradecyl, octadecyl, eicosyl, and 2-methylaminoethyl alcohols; carboxylic acids having up to 20 carbon atoms, e.g., formic acid, acetic acid, trifluoro-acetic acid, propionic acid, n-butyric acid, palmitic acid, stearic acid, etc.; hydroperoxides having to to 15 carbon atoms, e.g., t-butyl hydroperoxide, cumene hydroperoxide, p-methane hydroperoxide, cyclohexane peroxide, and urea peroxide.

Oxy- or chemiluminescent peraminoethylenes which can be employed in the formulations and methods of my invention include those described by the structural formula:

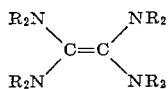

in which the R's, which can be alike or different, are straight or branched chain alkyl or cycloalkyl hydrocarbon radicals of from 1–10 carbons each, preferably no more than five carbons each, which can be joined pairwise on one nitrogen to form 3–5 membered monoaza heterocycles and on two nitrogens to form 3–7 membered diaza heterocycles. Specific oxyluminescent compounds of this type include tetrakis(dimethylamino)ethylene, tetrakis(N-pyrrolidinyl)ethylene, 1,1',3,3' - tetramethyl - $\Delta^{2,2'}$- bi(imidazolidine), 1,1',3,3' - tetraethyl - $\Delta^{2,2'}$ - bi(imidazolidine), 1,1'-diethyl-3,3'-dimethyl-$\Delta^{2,2'}$-bi(imidazolidine), 1,1',3,3' - tetramethyl - $\Delta^{2,2'}$ - bi(hexahydropyrimidine), and tetrakis(dimethylaminomethyleneamino)ethylene.

The tetrakis(dimethylamino)ethylene can be prepared by reaction of dimethylamine with chlorotrifluoroethylene as described in J. Am. Chem. Soc. 72, 3646 (1950). The other tetrakis(disubstituted-amino)ethylene of the above general formula and the bis(disubstituted-amino)hydrocarbyloxymethanes intermediate thereto can be prepared by reaction of the requisite basic secondary amine and any amide acetal, i.e., any disubstituted-amino-dihydrocarbyloxymethane in accord with the following stoichiometry:

(1)
$$R_2NCH(OR')_2 + R''_2NH \longrightarrow R''_2NCH(OR')_2 + R_2NH$$

(2)
$$R''_2NCH(OR')_2 + R''_2NH \longrightarrow (R''_2N)_2CHOR' + R'OH$$

(3)
$$2(R''_2N)_2CHOR' \xrightarrow{\Delta} (R''_2N)_2C=C(NR''_2)_2 + 2R'OH$$

wherein the R's, which can be alike or different, are monovalent alkyl or cycloalkyl radicals, generally of no more than eight carbons each, which can be together joined (in a divalent radical) to form with the intervening nitrogen a heterocycle of from three to seven ring members; the R's, which can also be alike or different, or together joined, are monovalent (or divalent) alkyl, aryl, aralkyl, alkaryl, or cycloalkyl radicals, generally of no more than eight carbons each, and when together joined, form with the two oxygens and intervening carbon a 1,3-dioxaheterocycle of from five to seven ring members; and the R''s, which can also be alike or different or together joined, are monovalent (or divalent) alkyl or cycloalkyl hydrocarbon or oxa- and/or azahydrocarbon radicals of no more than eight carbons each, each nitrogen carrying no more than one methyl group and, in the case of the divalent radicals, no more than 2–6 carbons per divalent radical. In any event, when the two R'''s are together joined, they form with the indicated amine nitrogen a monoazacarbocycle, an oxaazacarbocycle, or a diazacarbocycle of from three to seven ring members. This process is described in greater detail in my U.S. Patent 3,239,519.

Other useful chemiluminescent materials include chemiluminescent gels comprising the above-defined tetrakis(dihydrocarbylaminosubstituted)ethylenes thickened with at least 1% and generally no more than 50% by weight of said aminoethylene of a compatible, nonquenching, organic or inorganic thickening agent. If desired, from 10 to 90% by weight of the overall composition of an inert nonquenching solvent can be present to control the ultimate viscosity of the chemiluminescent gel.

The useful nonquenching thickening agents for forming the present chemiluminescent gels include nonreducible, noncoordinating inorganic oxides, preferably in colloidal dispersion, such as silica, alumina, zinc oxide and the like; organic nonquenching polymers such as the hydrocarbon polymers, e.g., polyisobutylene, polypropylene, polyethylene, and the like; nonquenching polyesters, e.g., polyvinyl acetate and the like; nonquenching polyethers such as polytetramethylene oxide and the like; nonquenching olefin/ester copolymers such as the ethylene/vinyl acetate copolymers, and the like.

The oxidizing conditions required to product luminescence of the tetrakis(disubstituted-amino)ethylene compositions can be obtained by using oxygen, air, mixtures of air, and/or oxygen, with other suitable diluent gases, e.g., nitrogen, or from the use of peroxides, both organic and inorganic. Suitable stable peroxides can be used instead and triggered by the addition of suitable chemical reactants or by heating the systems to the decomposition point of the stable peroxide.

The following examples, in which the parts given are by weight unless specified otherwise, are submitted to fully illustrate but not to limit this invention.

The quantitative data presented in the following detailed Examples I–VII were obtained in laboratory examinations of these compositions handled under the following techniques. In all instances except as noted, the composition whose relative chemiluminescence was being measured comprised 5 ml. of the indicated solvent and 5 ml. of TMAE with, as indicated, an addition of a specified amount of an hydroxylic-containing activator. Prior to use in these experiments, the solvents involved, except as noted, were purified by passage through activated alumina to remove any possible hydroxylic impurities.

The actual light emission of the resulting solutions on exposure to air was determined by placing them in a low-form 30 ml. Griffin beaker 1.25" in diameter which had the rim removed and had been silvered all over the outside facing. Such a beaker containing the above-described solution was placed in a 9" x 9" x 15" light-tight box provided with magnetic stirring means, including a polytetrafluoroethylene coated stirring bar for effecting mechanical stirring of the said solution in the said container. During the light emission under these test conditions, air (atmospheric) was passed into the light-tight box at approximately 800 cc. per minute through a vent in the side thereof and permitted to escape through small holes in the back of the light-tight box. The light emission of these test solutions was determined in this described light-tight cell by placing the said described container with the input solution 0.25" below the face of a commercially available selenium photovoltaic cell (an International Rectifier Corporation Model A 7-M). The resultant signal from this sensing selenium cell was monitored by a commercially available, suitable coupled microvolt amplifier (a Leeds and Northrup Microvolt Indicating Amplifier Model 9835A). The output signal from this amplifier was recorded by a commercially available chart recorder (a Leeds and Northrup Model G, 0–10 mil volt, strip chart recorder) to provide a record of light intensity over an experimental time interval.

Further, to determine the total light emitted from an experimental sample, the light intensity, as measured with the instrumentation described above, was integrated over a given interval with a commercially available electronic integrator (Model No. 2264 from the Research Appliance Corp. of Allison Park, Pa.). The entire measuring apparatus was calibrated by exposing the thus described selenium volatic cell to a light source of known flux density and measuring the circuit output voltage resulting from the input of said known flux density light source.

Example I

The following light emission results were obtained from compositions containing 5 ml. of tetrakis(dimethylamino) ethylene, the indicated volumes of the various hydrocarbon solvents, and the indicated volumes of added water or ethanol over a period of 30 minutes with the indicated specific values. The compositions were stirred during the determinations.

| Solvent (5 ml.) | Activator (0.05 ml.) | Light Emission over 30 Min., Lumen-sec. |
|---|---|---|
| Hexane | None | 1.6 |
| Do | Ethanol | 63 |
| Cyclohexane | None | 2.4 |
| Do | Ethanol | 86.5 |
| Do | Water | 41.2 |
| Decane | None | 6.4 |
| Do | Ethanol | 80.0 |
| Do | Water | 42.8 |
| Octane | None | 1.6 |
| Do | Ethanol | 94.5 |
| Do | Water | 40.5 |
| Diisobutylene | None | 2.4 |
| Do | Ethanol | 95.8 |
| Do | Water | 40.4 |
| Tetraisobutylene | None | 6.3 |
| Do | Ethanol | 128 |
| Do | Water | 33.2 |
| Decalin | None | 4.8 |
| Do | Ethanol | 106 |
| Do | Water | 59.5 |
| Hexadecane | None | 4.8 |
| Do | Ethanol | 80.0 |
| Do | Water | 73.5 |

Example II

Solutions were prepared from 5 ml. of tetrakis-dimethylamino)ethylene dissolved in 5 ml. of decane, purified by passage through activated alumina, and containing the hydroxylic activators in the amounts shown in the following table. The light emissions of the solutions on exposure to air, which were determined as given in Example I, show that the concentration of activator required for optimum light emission is critical and low. The light emission for the solution without added activator was 1.2 lumen-sec. during 30 min. exposure to air.

| Vol. of Activator, ml. | Light Emission over 30 min., Lumen-Sec. | | | | | |
|---|---|---|---|---|---|---|
| | Ethyl Alcohol | Isopropyl Alcohol | n-Butyl Alcohol | n-Octyl Alcohol | n-Decyl Alcohol | 2-Methyl-amino ethanol |
| 0.01 | 21.8 | 2.0 | 15.9 | 11.9 | 1.7 | 124 |
| 0.025 | 48.2 | | 64.6 | 56.4 | 21.5 | 132 |
| 0.05 | 91.0 | 80.0 | 102 | 103 | 86.4 | 130 |
| 0.075 | 96.4 | 95.1 | 101 | 125 | 106 | 109 |
| 0.10 | 84.6 | 93.6 | 88.9 | 152 | 131 | 87.2 |
| 0.125 | 74.5 | 85.6 | | 94.4 | 125 | |
| 0.15 | 51.8 | 83.4 | 73.0 | 81.7 | 116 | |
| 0.20 | 33.6 | 80.0 | 46.2 | 66.5 | 110 | |
| 0.50 | 7.4 | 17.4 | | 34.8 | 45.0 | |

Example III

To 10 ml. of a solution of equal volumes of tetrakis (dimethylamino)ethylene and decane (purified by passage through alumina) was added one of the activators given in the following table. The light emissions of the resulting solutions were determined as given in Example I, with the exception that the solutions were not stirred. Although each activator was not completely miscible at the concentrations employed, activation of oxyluminescence was provided by that portion of each which dissolved.

Activator:   Light emission over 30 min., lumen-sec.
- None --- 1.6
- 0.2 ml. water --- 6.3
- 0.1 ml. 2-methylaminoethanol --- 40.3

Example IV

To 10 ml. of a solution of equal volumes of tetrakis(dimethylamino)ethylene and decane (purified by passage through alumina) was added one of the hydroperoxides given in the following table. The light emissions of the resulting compositions were determined as given in Example I.

Activator:   Light emission over 30 min., lumen-sec.
- Tert-butyl hydroperoxide (0.04 ml.) --- 75.0
- Cumene hydroperoxide (0.02 ml.) --- 78.4
- p-Methane hydroperoxide (0.02 ml.) --- 85.5
- Cyclohexanone peroxide (0.01 ml.) --- 76.0
- Urea peroxide (0.02 ml.) --- 41.2

Example V

Thickened compositions were prepared by dissolving 6 g. (3 g. when Nujol was the solvent) of polyisobutylene (Vistanex MM–L–120) in 100 ml. of solvent, which was passed through activated alumina to remove adventitious hydroxyl impurities, and adding 100 ml. of tetrakis(dimethylamino)ethylene under nitrogen. To each of the resulting clear viscous solutions was added one of the activators in the amounts listed below. The light emission of the final solutions on exposure to air was determined as given in Example I.

| Solvent | Activator | Light Emission over 30 min., Lumen-sec. |
|---|---|---|
| Decane | None | 4.0 |
| Do | 2.0 ml. decyl alcohol | 52.5 |
| Do | 2.0 ml. 2-methylaminoethanol | 47.0 |
| Triisobutylene | None | 7.9 |
| Do | 1.0 ml. decyl alcohol | 37.3 |
| Do | 2.0 ml. 2-methylaminoethanol | 44.5 |
| Tetrapropylene | None | 9.5 |
| Do | 2.0 ml. decyl alcohol | 33.5 |
| Do | 1.0 ml. 2-methylaminoethanol | 27.7 |
| Nujol | None | 18.2 |
| Do | 2.0 ml. decyl alcohol | 62.6 |
| Do | 1.0 ml. 2-methylaminoethanol | 64.1 |

Example VI

To 5 ml. of decane (purified by passage through alumina) was added one of the hydroxylic activators in the concentration given below. The mixture was stirred for 10–15 seconds, then 5 ml. of tetrakis(dimethylamino)-ethylene was added and the light emission of the final solution was determined as given in Example I.

Activator:   Light emission over 30 min., lumen-sec.
- Glacial acetic acid, ml.—
  - 0.01 --- 17.9
  - 0.05 --- 17.5
  - 0.10 --- 15.1
- Trifluoroacetic acid, ml.—
  - 0.01 --- 63.5
  - 0.05 --- 53.2
  - 0.10 --- 29.6

The following example is designed to show the advantage of controlling the amount of hydroxylic activator present in a chemiluminescent peraminoethylene composition.

*Example VII*

The following light emission results, determined as given in Example I, were obtained on compositions containing 5 ml. of tetrakis(dimethylamino)ethylene and 5 ml. of the indicated decane. Ethanol was added as the activator where indicated.

| Solvent | Activator | Light Emission over 30 min., Lumen-sec. |
|---|---|---|
| Decane, 99%:[1] | | |
| As received | None | 4.8 |
| Do | 0.05 ml. ethanol | 97.5 |
| Decane, 95%:[2] | | |
| As received[3] | None | 107.8 |
| Do | 0.05 ml. ethanol | 78.5 |
| Passed through alumina | None | 6.3 |
| Do | 0.05 ml. ethanol | 80.1 |

[1] Humphrey-Wilkinson, Inc., 99% min., Lot No. 308D. Shown to be free of hydroxyl impurities.
[2] Humphrey-Wilkinson, Inc., 95% min., Lot No. 308. Shown to contain as an impurity 0.65 ml. of n-octyl alcohol in 100 ml. of the decane.
[3] The effect of excess activator in decreasing light output is shown in a comparison of this experiment with the preceding experiment.

*Example VIII*

Cyclohexane was refluxed over sodium to remove traces of water that were present. A solution of 1%, by volume, of tetrakis(dimethylamino)ethylene in this purified cyclohexane was found to emit no light when the solution was exposed to dry oxygen for several hours, and observed with dark-adapted eyes. The addition of 60 p.p.m. of water to a 1% solution of tetrakis(dimethylamino)ethylene in dried cyclohexane, followed by exposure of the solution to oxygen for several hours, resulted in an oxyluminescence intensity having an arbitrary value of 1 (as measured by a phototube and electronic counter to monitor the intensity). The oxyluminescense intensity of the anhydrous tetrakis(dimethylamino)ethylene-cyclohexane solution was 0 on this scale. The addition of 180 p.p.m. of water to another portion of 1% solution of tetrakis(dimethylamino)ethylene is dried cyclohexane, followed by exposure to oxygen, resulted in an oxyluminescence intensity of 14, measured in the same way. Thus, an increase from 60 p.p.m. to 180 p.p.m. of water increases the oxyluminescence intensity 14-fold.

*Example IX*

The effectiveness of various alcohols as oxyluminescence activators was determined by placing standard solutions containing 0.70 ml. of tetrakis(dimethylamino)ethylene, the amount of specific alcohol activator listed in the following table, and 100 ml. of the particular solvent listed in the table in a spherical flask. The quantum yield of oxyluminescence produced in the sample was measured by viewing the sample by a calibrated photo tube, and the current generated by the phototube was integrated with an electric counter. The results in the table are expressed as Einsteins emitted per mole of tetrakis(dimethylamino)ethylene consumed.

TABLE.—OXYLUMINESCENCE YIELD OF 0.7%, BY VOLUME, SOLUTIONS OF TETRAKIS(DIMETHYLAMINO)ETHYLENE IN VARIOUS SOLVENTS ACTIVATED BY ALCOHOLS

| Activator | Solvent | Oxyluminescence Quantum Yield |
|---|---|---|
| Methyl alcohol, 1.5 ml | Triethylamine | $2.2 \times 10^{-5}$ |
| Methyl alcohol, 1.0 ml | Cyclohexane | $6.3 \times 10^{-6}$ |
| Methyl alcohol, 0.5 ml | do | $3.7 \times 10^{-6}$ |
| t-Butyl alcohol, 2.0 ml | do | $2.2 \times 10^{-5}$ |
| Tetradecyl alcohol, 2.5 ml | do | $2.6 \times 10^{-5}$ |
| Isopropyl alcohol, 2.0 ml | do | $6.0 \times 10^{-5}$ |

Since hydroxylic compounds used in large quantities have a quenching effect on oxyluminescence of tetrakis(disubstituted-amino)ethylenes, the following example was carried out to determine the quenching rates of several typical hydroxylic activators.

*Example X*

The quenching rates of the hydroxylic activators mentioned in the following table were determined by following the decrease in lifetime of tetrakis(dimethylamino)ethylene excited state on incremental addition of the activator to solutions of the tetrakis(dimethlylamino)ethylene in anhydrous cyclohexane. A glass sample cell of 3 ml. capacity was used, and this was charged with a $3 \times 10^{-2}$ molar solution of tetrakis(dimethylamino)ethylene in cyclohexane (previously dried over sodium). The activator was added to the solution in the cell in increments of 20–50 microliters, up to a maximum of 300 microliters in some cases. The quenching rate constants obtained are summarized in the following table. These rate constants were calculated using the Stern-Volmer equation for calculating quenching rate constants (see Pringsheim's "Flourescence and Phosphorescence," Interscience Publishers, Inc., New York, 1949, pages 6, 7, 90 and 91).

TABLE.—OXYLUMINESCENCE QUENCHING RATES OF HYDROXYLIC ACTIVATORS

| Hydroxylic compound: | Quenching rate constant, in liters/mole-seconds |
|---|---|
| Water | $50 \times 10^8$ |
| Methyl alcohol | $9.3 \times 10^8$ |
| n-Butyl alcohol | $4.6 \times 10^8$ |
| Isoamyl alcohol | $4.5 \times 10^8$ |
| t-Butyl alcohol | $1.9 \times 10^8$ |

The thickened activated chemiluminescent gels of the present invention are particularly useful in that they permit application of the chemiluminescent tetrakis(dihydrocarbylamino)ethylenes to surfaces where the physical nature of the luminescent aminoethylenes would not permit efficient, and in some instances any, use. Thus, the liquid chemiluminescent aminoethylenes, if applied per se to vertical surfaces, would have extremely inefficient chemiluminescent periods since they obviously would flow from the applied surfaces where luminescent action was desired. Furthermore, no patterned chemiluminescent signals would be possible. On the other hand, the thickened gel compositions of the present invention can easily be applied to such surfaces wherein, by nature of their controlled high viscosities, they remain on the applied portions and furnish chemiluminescence in the desired areas for effectively long times.

These thickened activated chemiluminescent gels, by virtue of the controllable degree of thickness achieved therein through variations in the relative concentrations of the thickening agents, afford means for simply and effectively controlling the rate of oxidation of the tetrakis(dihydrocarbylamino)ethylenes and thereby also controlling both the rate and the intensity of the chemiluminescence. It is not known whether this rate-controlling action functions through control of the transpiration of the necessary oxygen into the thickened gels or by control of the rate of exudation of the aminoethylenes to the surface. In any event, whether the control functions through one or both of the just described mechanisms, the control of the rate and intensity of the luminescence is fundamental, varying with decreased intensity and increased time of the luminescence as the viscosity of the thickened gels increases.

Still another important property exhibited by the thickened activated chemiluminescent gels of the present invention is the ability to apply these compositions to a wide variety of surfaces while still maintaining the desired chemiluminescence. Without the thickened gels the chemiluminescent aminoethylenes, when applied to highly porous surfaces, are relatively inefficient in both the intensity and time of the chemiluminescence. Thus, when the chemiluminescent aminoethylenes, especially the liquid ones, are applied to such relatively porous surfaces as cloth, e.g., boat sails, parachutes, life jackets and the like, even in the horizontal position, the aminoethylene species are rapidly absorbed into the interior of the substrate. Accordingly, while in all probability they are still absorbing oxygen and chemiluminescing, the chemiluminescence is not visible on the applied surfaces and the desired use function has disappeared. The same equally well applies to instances of application to ground cover such as the earth, and in particular to the more highly porous forms thereof, e.g., sand as found on most oceanic beaches, in which places in times of emergency efficient chemiluminescence would be needed. The thickened chemiluminescent gels of the present invention do not become so internally absorbed and thus effectively markedly increase the light-generating efficiency of the tetrakis(dihydrocarbylamino)ethylenes on such substrates and render possible their use as chemiluminescent marking or signalling materials in much broader and more versatile fields.

A portion of this invention concerns activated chemiluminescent aerosols of the just described chemiluminescent tetrakis(disubstituted-amino)ethylenes. The term "aerosols" is believed to be well known to the packaging art. The first and probably most scientific usage thereof occurred in early colloidal chemistry—see, for instance, Whitlaw-Gray and Patterson, "Smoke," Arnold and Company, Limited, London (1932), as defining a colloidal system consisting of very finely subdivided liquid or solid particles dispersed in and surrounded by a gas. More recently, Sinclair in "Handbook on Aerosols" (1950), Washington, D.C., on page 64, stated that such particles should be smaller in size than 50 microns and usually less than 10 microns. In the early 1940's, this term was used to describe insecticides packed in a self-pressurized pack and the Chemical Specialties Manufacturers Association, Incorporated, of New York evolved the following definition of an aerosol product:

"A self-contained sprayable product in which the propellant force is supplied by a liquefied gas. Includes space, residual, surface coating, foam and various other types of product but does not includes gas-pressurized products such as whipping cream. The term aerosol as used here is not confined to the scientific definition."

The best modern definition is believed to be as follows:

"A much more satisfactory term for the subject described in this book is 'pressurized pack' which may be defined as a self-contained pack which contains the product and the propellant necessary for the expulsion of the former. This definition includes packs which utilize compressed gases as propellants and, by discarding the term 'aerosol,' acknowledgement is made of the fact that this work has a scientific meaning."

These foregoing two quotations are taken from "Pressurized Packaging (Aerosols)" by Herzka and Pickthall, Academic Press, New York (1958).

Recognizing that the above confusion does exist and that the last quoted definition is the most recent, the term "aerosols" will be used in the following as applying generically to all pressurized packs including those where the propellant is a pressurized gas, either supplied in situ from another state form thereof, e.g., charging solid carbon dioxide to the propellant container and sealing, or where the pressurized gas is charged as such directly.

The possible variables in the formulation of these activated chemiluminescent aerosols as to propellants, dispenser components, filling techniques, laboratory evaluation, formulations, and the like, are the same as those already in the general aerosol art, all as discussed in detail in the above definitive text by Herzka and Pickthall. The only variation in the present compositions and techniques over those discussed in this publication is the necessary presence of one or more of the chemiluminescent tetrakis (disubstituted-amino)ethylenes which serve to render the thus formulated aerosols chemiluminescent. By reference to this publication all disclosures and discussions therein are made common to this specification.

In the foregoing and elsewhere, reference is made to "chemiluminescent aerosols." It is recognized that this is not necessarily correct since some of the compositions in "aerosol" form do not chemiluminesce per se. However, in all instances when the aerosol containing the chemiluminescent tetrakis(disubstituted-amino)ethylene and hydroxyl activator is deposited on a necessarily ultimate surface, chemiluminescence will occur.

These formulations of tetrakis(disubstituted-amino) ethylenes containing hydroxylic activators and those modified as described herein, e.g., those including solvents, thickening agents, aerosol propellants, coloring agents, etc., along with a source of the necessary oxygen or comparable oxidizing conditions, have obvious utility in many applications. For example, they are useful for use in flares for night-time signalling and particularly in providing useful distress or warning signals operable in air when constructed in self-contained assemblies providing the necessary solvent. Flares containing these compositions are also convenient for illuminating areas on roadways during temporary emergency conditions, such as automobile accidents or other obstructions to traffic.

The aerosol compositions containing the hydroxylic activated tetrakis(disubstituted-amino)ethylenes are useful in providing a luminescent spray or cloud that is visible in a darkened area, and for applying a luminescent coating to objects or surfaces of many types.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A chemiluminescent formulation comprising (a) at least one tetrakis(disubstituted-amino)ethylene of the formula wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle, (b) a nonquenching organic solvent, and (c) from 0.01 to 10% by volume, based on the overall formulation, of a hydroxylic activator, said activator selected from the group consisting of water, alcohols and carboxylic acids of up to 20 carbons and organic hydroperoxides of up to 15 carbons being present in the phase containing the tetrakis(disubstituted-amino)ethylene.

2. An activated chemiluminescent composition comprising tetrakis(dimethylamino)ethylene, a nonquenching organic solvent, and from 0.01 to 10% by volume, based on the overall composition, of a hydroxylic activator selected from the group consisting of water, alcohols and carboxylic acids of up to 20 carbons and organic hydroperoxides of up to 15 carbons, said activator being present in the phase containing the tetrakis(dimethylamino) ethylene.

3. An oxyluminescent gel comprising
(a) at least one tetrakis(disubstituted-amino)ethylene of the formula

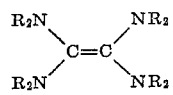

wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle,
(b) from 0.01 to 10% by volume, based on the overall composition, of a hydroxylic activator selected from the group consisting of water, alcohols and carboxylic acids of up to 20 carbons and organic hydroperoxides of up to 15 carbons, said activator being present in the phase containing the tetrakis(disubstituted-amino)ethylene and,
(c) from 1 to 50% by weight, based on the tetrakis(disubstituted-amino)ethylene of, a compatible nonquenching thickening agent.

4. A gel of claim 3 containing additionally a solvent selected from the class consisting of hydrocarbons, hydrocarbon esters and hydrocarbon ethers.

5. An activated chemiluminescent gel formed from tetrakis(dimethylamino)ethylene, polyisobutylene, decane and from 0.01 to 10% by volume of decyl alcohol.

6. A charge for a pressurized pack for generating aerosols comprising
(a) at least one tetrakis(dihydrocarbylamino)ethylene of the formula

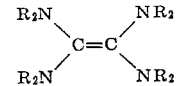

wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle,
(b) from 0.01 to 10% by volume, based on the overall, of a hydroxylic activator selected from the group consisting of water, alcohols and carboxylic acids of up to 20 carbons and organic hydroperoxides of up to 15 carbons, said activator being present in the phase containing the tetrakis(disubstituted-amino)ethylene, and
(c) a compatible, nonquenching aerosol propellant.

7. A method for improving the chemiluminescence of tetrakis(disubstituted-amino)ethylenes of the formula

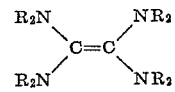

wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle, which comprises
adding to a composition containing at least one of said tetrakis(disubstituted-amino)ethylenes and a nonquenching organic solvent, from 0.1 to 10% by volume based on the overall composition of a hydroxylic activator selected from the group consisting of water, alcohols and carboxylic acids of up to 20 carbons and organic hydroperoxides of up to 15 carbons, said activator being present in the phase containing the tetrakis(disubstituted-amino)ethylene.

8. A method for improving the chemiluminescence of tetrakis(disubstituted-amino)ethylenes of the formula

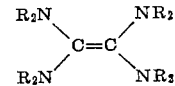

wherein the R's are selected from the group consisting of monovalent alkyl and cycloalkyl of up to 10 carbons, divalent alkylene joined to the other R attached to the same N to form a 3–5 membered monoaza heterocycle and divalent alkylene joined to an R attached to a second N to form a 3–7 membered diaza heterocycle, which comprises
adding, to a tetrakis(disubstituted-amino)ethylene of the above formula homogeneously dissolved in a nonquenching organic solvent selected from the class consisting of hydrocarbons, hydrocarbon esters and hydrocarbon ethers, a hydroxylic activator in an amount of from 0.01 to 10% by volume, said hydroxylic activator being selected from the group consisting of water, alcohols and carboxylic acids of up to 20 carbons and organic hydroperoxides of up to 15 carbons.

References Cited

UNITED STATES PATENTS 3,264,221  8/1966  Windberg _____ 252—188.3

LEON D. ROSDOL, *Primary Examiner.*

HERBERT B. GUYNN, *Examiner.*

J. D. WELSH, *Assistant Examiner.*

UNITED STATES PATENT OFFICE
CERTIFICATE OF CORRECTION

Patent No. 3,360,473 December 26, 1967

Hilmer Ernest Winberg

It is hereby certified that error appears in the above numbered patent requiring correction and that the said Letters Patent should read as corrected below.

Column 10, line 61, strike out "said activator" and insert the same after "carbons" in line 64, same column 10.

Signed and sealed this 4th day of February 1969.

(SEAL)
Attest:

Edward M. Fletcher, Jr.        EDWARD J. BRENNER
Attesting Officer              Commissioner of Patents